Nov. 4, 1941.  M. EWALD  2,261,150

FRUIT SPLITTING AND SPREADING APPARATUS

Original Filed March 6, 1935  4 Sheets-Sheet 1

INVENTOR.
Mark Ewald
BY
ATTORNEY.

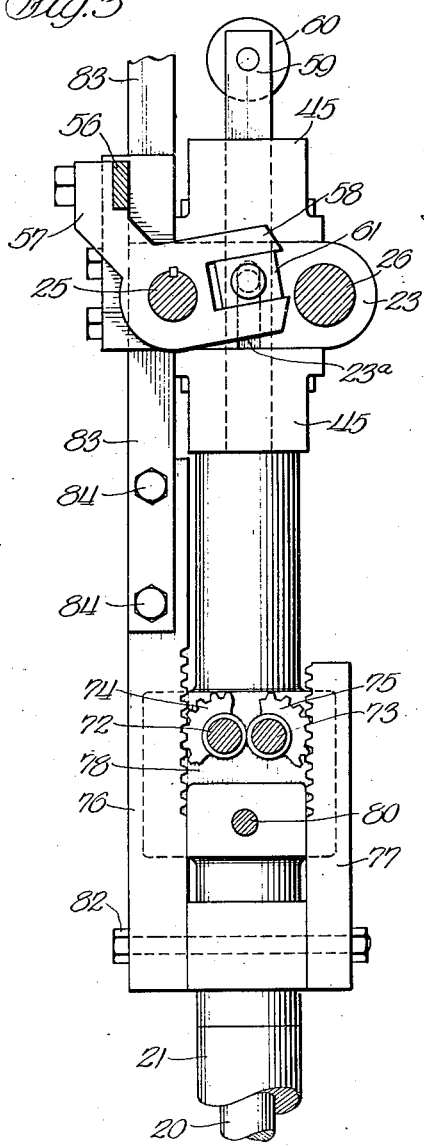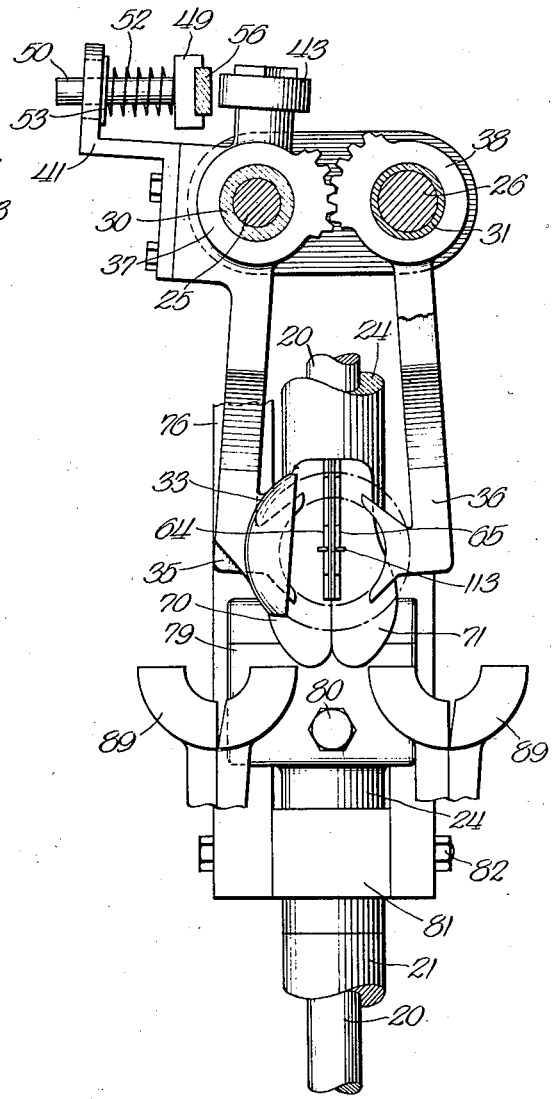

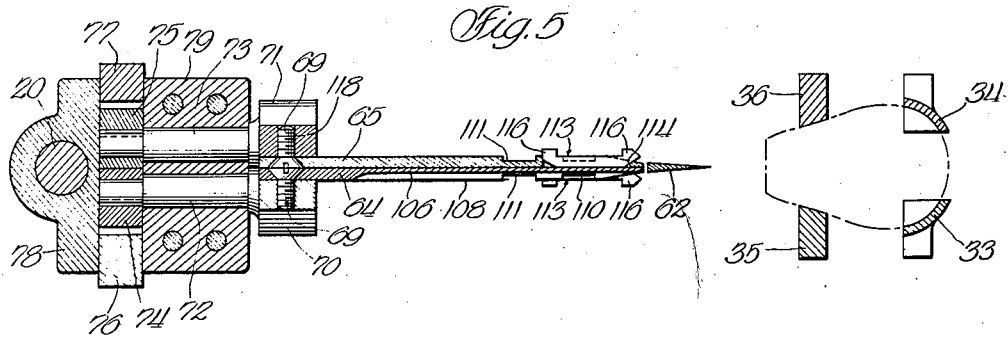
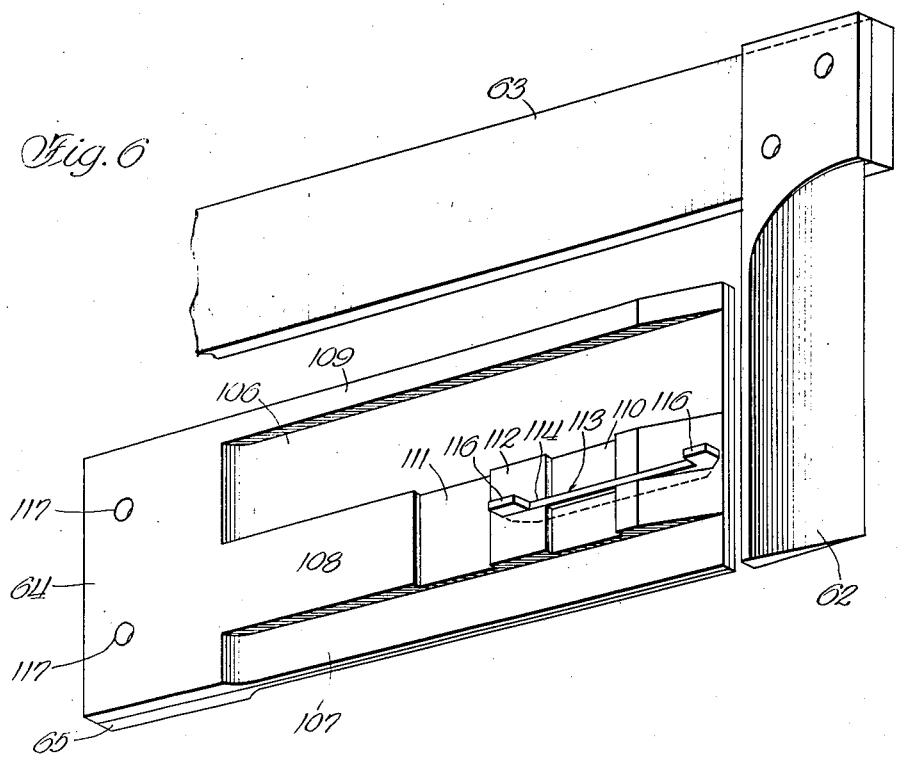

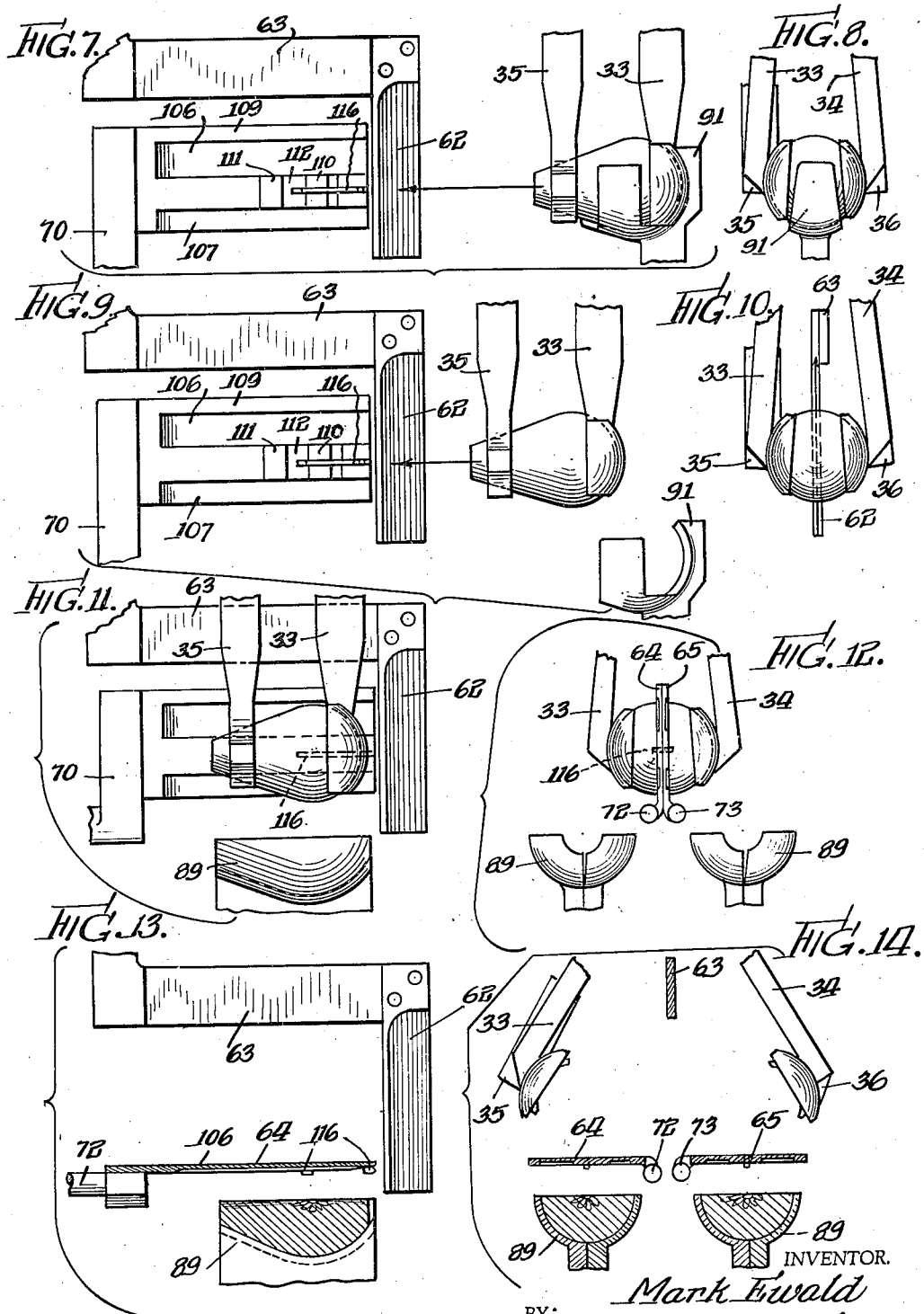

Patented Nov. 4, 1941

2,261,150

UNITED STATES PATENT OFFICE 2,261,150

FRUIT SPLITTING AND SPREADING APPARATUS

Mark Ewald, Olympia, Wash., assignor to Special Equipment Company, Portland, Oreg., a corporation of Oregon Application March 6, 1935, Serial No. 9,573
Renewed August 6, 1940

14 Claims. (Cl. 146—72)

This invention relates to a machine for cutting or splitting fruit into sections. More particularly, it relates to improvements over the construction of such machines disclosed and claimed in my Patent No. 1,989,090, issued January 29, 1935, as well as over the further improvements disclosed in my application, Serial No. 201,838, filed April 13, 1938.

The objects of the present invention are to provide an improved construction of spreader plate whereby more effectively to prevent the adherence of the cut fruit to the sides of the spreader plate so as to facilitate the dumping or distributing of the cut fruit by the spreader plate into the fruit holding cups; to provide an improved type of stationary fruit splitting knife; to provide an improved mounting for the stationary splitting knife; to provide an improved mounting for the splitting knife and spreader plate from the central bearing surrounding the main turret shaft; to provide an improved type of fin construction for preventing lateral movement of the cut fruit with respect to the spreader plate and to provide an improved type of combination mounting between the spreader plate and the fin mechanism; and to provide an improved type of mounting or connection between the spreader plate and its actuating mechanism.

Other objects of the invention will be apparent from a perusal of the following specification when taken in connection with the accompanying drawings, wherein:

Figure 3 is a vertical section taken on the line 3—3 of Figure 2;

Figure 4 is a vertical section taken on the line 4—4 of Figure 2;

Figure 5 is an enlarged detailed section of fruit spreading wings and clamping jaws taken on the line 5—5 of Figure 2;

Figure 6 is an enlarged perspective of the splitting knife and spreading wings; and Figures 7 to 14, inclusive, are diagrammatic views showing the consecutive order of the various steps of the treatment of fruit performed by the structure disclosed in the drawings.

Like reference characters are used to designate similar parts in the drawings and in the following description.

This invention relates to a splitting device which is but one part of a fruit treating machine. Preferably there are four stations to such a machine as is illustrated, namely: station A where the fruit herein shown as a pear treating machine is split and bobbed and with which this invention deals in detail; station B where the peeling of the fruit is removed; station C where the coring of the fruit occurs; and station D where the fruit cups are scavenged.

Figure 1:
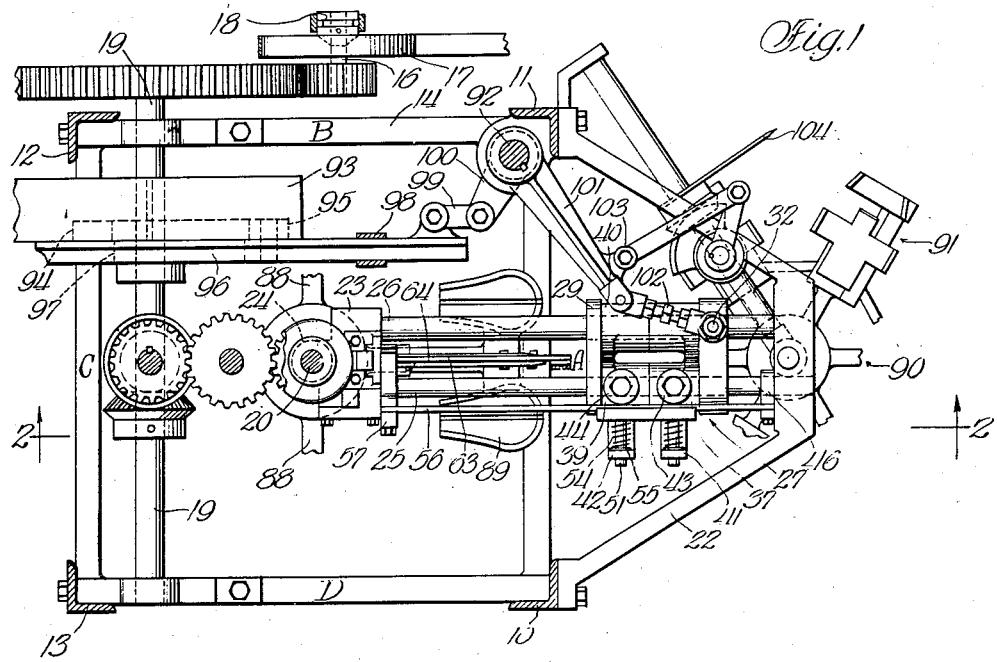
Figure 1 is a plan section of a machine in which the present invention is employed, parts being omitted for clarity of illustration.
Figure 2:
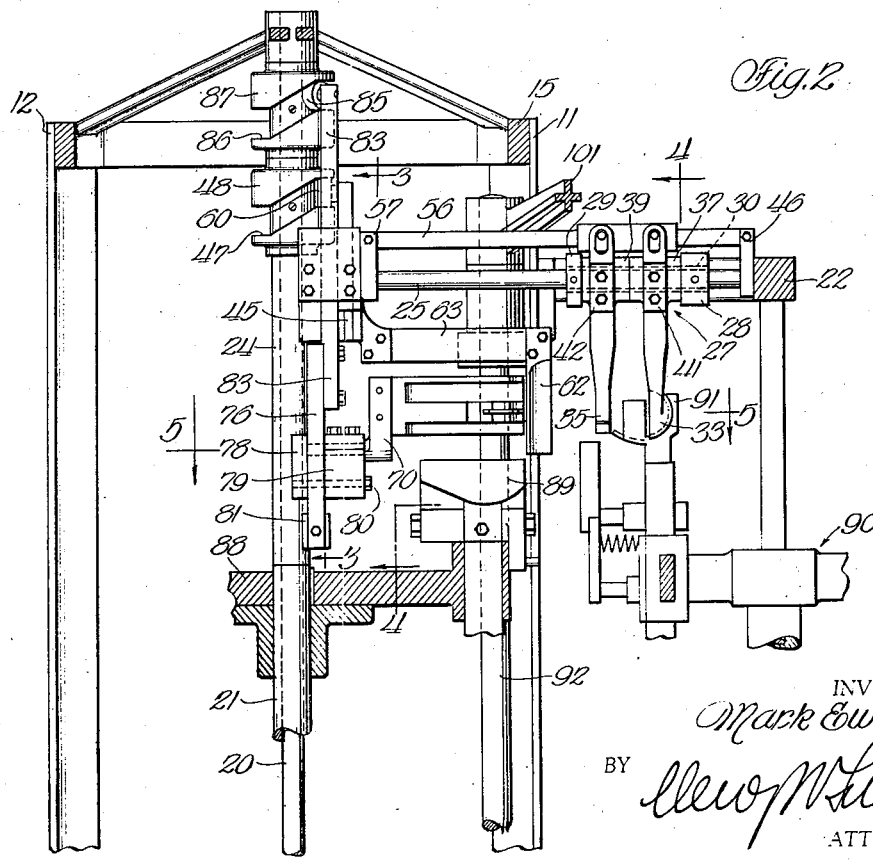
Figure 2 is a longitudinal section taken on the line 2—2 of Figure 1.

The principal machine, as illustrated in Figures 1 and 2, comprises uprights 10, 11, 12 and 13. Transverse frame supports comprise a lower member 14 and an upper member 15. A main shaft 16 to which a pulley 17 is connected and disconnected by a clutch 18 or other suitable device is driven by a belt from a prime mover, not shown. The main shaft, by suitable gears, drives a cam shaft 19 supported in bearings on the transverse frame member 14.

The entire apparatus is actuated through a series of cams, gears, links, levers and other parts driven directly or indirectly by the main shaft 16 and cam shaft 19. A central shaft 20 journalled in members 14 and 15, a fruit feeding turret sleeve 21 surrounding the central shaft 20, and several other shafts and parts obtain their power from the cam shaft 19. The several parts of the apparatus are actuated in synchronism and in timed relation.

The splitter and spreader is mounted partly upon a bracket 22 which extends outwardly from the side of the machine from the uprights 10 and 11 and partly upon a block 23 which is integral with a sleeve 24 mounted on shaft 20, but not rotating therewith. Bars or rods 25 and 26 which are parallel and which form tracks, extend from bracket 23 to bracket 22, the rod 25 being mounted rotatively therein. A carriage 27 rides upon the rods 25 and 26. Carriage 27 comprises end members 28 and 29 which are connected one to another by sleeves 30 and 31. The sleeves 30 and 31 surround and are reciprocated upon the tracks 25 and 26. A stud 32 for attaching a carriage driving link is disposed on end member 28.

Opposed pairs of complemental fruit gripping jaws depend from sleeves 30 and 31. The jaws comprise one pair of cup members 33 and 34 adjacent end member 28. Members 33 and 34 are shaped to surround the blossom end of a pear. Jaws 35 and 36, which are somewhat forked shaped, clamp upon the front or stem end of a pear, engaging it at opposite sides in planes slightly removed from the stem end.

Each of the several jaws has a shank extending upwardly therefrom. The shanks have integral hubs with gear teeth over an arcuate section thereof. The hubs which support jaws 33 and 35 have bosses on the side opposed to the gear teeth. Jaw 33 is formed integrally with hub 37, jaw 34 with hub 38, jaw 35 with hub 39, and the jaw 36 with hub 40. The hubs 37 and 39 rotate freely about the sleeve 30 and the hubs 38 and 40 rotate freely about sleeve 31. The longitudinal dimension of the two pairs of hubs is such that they fill, without binding, the space between the end members 28 and 29 of carriage 27.

Because of the meshing of the teeth of hub 37 with the teeth of hub 38, the members 33 and 34 of this pair of jaws move concurrently in opposite directions. The forks 35 and 36 move in the same manner because of the meshing teeth in their respective hubs 39 and 40. The movement of hubs 37 and 38 is independent of the movement of hubs 39 and 40.

Brackets 41 and 42 are attached to bosses on hubs 37 and 39 respectively. Each bracket 41 and 42 has a flange through which machine screws or bolts are inserted into the hubs 37 and 39, respectively, for attachment. Each bracket has a projecting section and an upturned apertured arm. The aperture in each of the arms is elongated.

Studs extend upwardly from hubs 37 and 39, each stud having a roller bearing secured thereto by a cap screw or the like. Rollers 43 and 44 are rotatively mounted on the roller bearings on hubs 37 and 39 respectively. Between rollers 43 and 44 and the arms of complemental brackets 41 and 42 is a resiliently mounted shoe. Such resiliently mounted shoe comprises an elongated flanged member 49. Stems 50 and 51 projecting therefrom extend through apertures in the brackets 41 and 42. A spring 52 about the stem 50 and a washer 53 between the end of the spring 52 and the inside surface of the apertured arm of bracket 41 forces one end of the shoe inwardly. A second spring 54 surrounds stem 51 and a washer 55 between the end of the spring 54 and the inner surface of bracket 42 forces the other end of the shoe 49 inwardly.

A bar 56 is disposed between rollers 43 and 44 and the shoe member 49. Bar 56 is secured to the outer end of an arm 46 which is keyed to rod 25 adjacent the frame 22. The other end of the bar 56 is secured on a driving arm 57 of a bell crank which is also keyed to rod 25. The bell crank has a bifurcated arm 58 at an angle to arm 57. Secured upon the bracket 23 by bolts are guide blocks 45 having therein vertical tracks or grooves for a reciprocating bar 59. Bar 59 has rotatively mounted on its uppermost end a roller 60 for engaging a cam track 47 in a drum cam 48. Cam 48 is keyed to shaft 20 and rotates therewith. A lug 61 is pivotally attached to the lower end of bar 59 for imparting a rocking motion to the bifurcated arm 58 of the bell crank. The lug 61 is rectangular in cross section and its sides engage the slot in bifurcated arm 58. The slot 23a in the block 23 allows reciprocating motion of the bar 59 and its associated parts.

Positioned in the path of movement of carriage 27 is a splitting knife 62 rigidly secured in place by an arm 63, bolted to its upper end, and extending to a bracket on the lower guide block 45. The arm 63 is secured to the guide block bracket by bolts or in any other suitable manner. Disposed directly behind knife 62 are spreading wings 64 and 65. The wings and knife are best illustrated in Figures 5 and 6.

The wings are substantially flat rectangular members having two longitudinal grooves 106 and 107 in their outer faces. Grooves 107 are adjacent the bottom edge of the wings and grooves 106 are parallel and just below the top surface of the wings. The grooves 106 and 107 leave two ridges 108 and 109 in relief. The ridges 108 and 109 are tapered at their forward ends to the depth of the grooves 106 and 107. Thus the entire assembly is of the same thickness, at its forward edge, as the rear edge of the knife blade 62. In the ridge 108, to the rear of the taper, are transverse grooves 110 and 111 leaving a lug 112, a part of the ridge 108, therebetween. The foregoing construction prevents the fruit sticking to the wings because only relatively small flat portions 108, 109, and 112 come in contact with the fruit, and furthermore, the grooved portions 106, 107, 110 and 111 prevent the creation of a vacuum between the wings and the cut face of the fruit.

A fin 113, located in a slot 114 in the forward central portion of the ridge 108, cuts into the fruit at its core section and prevents the halved fruit that is impaled thereon from sliding laterally upon either wing. Such centrally mounted fins comprise a longitudinal body 115 portion for engagement with the slot 114, and lateral lugs 116 extending therefrom.

It will be noted that by locating the fruit-piercing or holding means at the core or seed-containing section of the half fruit, the fin will pierce this seed-carrying section whereby to hold the fruit temporarily in place on the spreader while at the same time not impairing the appearance of the fruit due to the fact that the seed-containing section is subsequently removed by a severing operation.

The rear portion of the wings 63 and 64 are secured by machine screws 69 to blade reenforcing arms 70 and 71. Integral with and adjacent to the bottom edges of arms 70 and 71 are parallel horizontal stud shafts 72 and 73 respectively. Keyed upon stud shafts 72 and 73 are segmental pinions 74 and 75 for cooperation with racks 76 and 77. Pinions 74 and 75 and racks 76 and 77 are within the space between boss 78 of sleeve 24 and a cover plate 79. Plate 79 also serves as a bearing block for stud shafts 72 and 73.

The stud shafts are held in position by a bearing cap secured in any conventional manner. The plate or bearing block 79 is clamped to the boss 78 by an elongated bolt 80. Racks 76 and 77 reciprocate vertically in unison within the space just described and are spaced transversely apart by a block 81. Rack 76, block 81 and rack 77 are rigidly clamped together by a bolt 82.

Rack 77 extends upwardly and laps over a reciprocating bar 83. The two being clamped together with bolts 84. Bar 83 is guided by an orifice in guide block 23. Pivotally mounted on the uppermost end of reciprocating bar 83 is a cam roller 85 which coacts with a cam groove 86 of drum cam 87. Drum cam 87 is keyed to shaft 20 and revolves therewith.

A main turret 88 keyed to sleeve 21 supports paired fruit cups 89 directly below the blades 63 and 64 in their lowered or spread position. The main turret 88 is rotated in synchronous intermittent stages by a Geneva movement (not shown) driven from the cam shaft 19.

A feed turret 90 supporting feeding cups 91 is intermittently rotated by a Geneva movement (not shown) driven by the cam shaft 19. A rocker shaft 92 is also driven by cam shaft 19. A face cam 93 is keyed to cam shaft 19. A cam groove 94 in the face of cam 93 imparts a reciprocal movement to a cam roller 95 which is pivotally mounted on a cam follower plate 96. Cam follower plate 96 is guided by a horizontal elongated slot 97 and guides 98. A boss on the forward end of the plate 96 drives a link 99 which imparts on oscillating motion to lever 100 which is keyed to rocker shaft 92. An arm 101, keyed to shaft 92, with an adjustable driving link 102 drives the carriage 27 in a reciprocal manner. A boss 103 on lever 100, through a series of links, arms and bevelled gears oscillates a bobbing knife 104.

The operation of the splitting and spreading mechanism is substantially as follows. The fruit feeding turret 90 intermittently advances fruit in the fruit feeding cups 91 past a bobbing knife 104 where the stem or small end of the fruit is cut off. The bobbing knife, as previously described, is operated from the arm 101. The feeding turret 90 continues to rotate, bringing the bobbed fruit directly under the carriage 27. The feeding cup 91 in which the fruit is disposed is raised at this point to present the fruit to the jaws depending from the carriage 27. The fruit feeding cup remains in its raised position long enough to allow the jaws depending from the carriage 27 to swing together clamping the fruit therebetween.

This clamping of the fruit is accomplished through a series of gears driven from cam shaft 19 to the central vertical shaft 20. The drum cam 48 is keyed to this shaft 20 and moves therewith. The cam track 47 reciprocates a vertical bar 59 because the latter has a roller 60 at its top end riding in such cam track. The lug 61 on the lower end of bar 59 reciprocates therewith and acts on the bell crank to swing its bifurcated arm 58 upwardly and downwardly (see Figure 3).

The vertical arm 57 of the bell crank is thus made to swing outwardly to force the longitudinal bar 56 against the shoe 49. The shoe 49 presses against the springs 52 and 54 which imparts a pressure against the upturned apertured arms 41 secured on the hubs 37 and 39 forcing such arms outwardly. The depending shanks of the hubs 37 and 39 act as levers to force inwardly the jaws 33 and 35 on the lower end of the shanks. Segmental gears on the hubs 37 and 39 meshed with segmental gears on hubs 38 and 40, respectively, force jaws 34 and 36 inwardly concurrently with the inward movement of the jaws 33 and 35 to clamp fruit therebetween. The feed cup then drops down and out of the way of the jaws. The jaws are grooved and the cup so formed that there is no possible contact of these parts one with another. The carriage 27, with a pear resiliently held between its jaws, is then advanced toward and past the cutting edge of the splitting knife.

The pear in the jaws on carriage 27 moves inwardly against the splitting knife 62. The fruit is split lengthwise parallel to its axis. As the pear is being split by inward movement of the carriage, it is impaled upon fins 116 projecting from the wings 64 and 65. Such impalement prevents the halved sections of the pear from sliding laterally upon the blades during the splitting operation and as the jaws are released from about the pear.

After the pear has been split its full length, the jaws, retaining the pears against the knive 62, are opened by the reversing of the direction of travel of cam roller 60 controlled by the cam groove 47. This opening causes the bar 59 to drop, moving the bell crank in the opposite direction and forcing the bar 56 on the bell crank against the rollers 43 and 44, swinging them inwardly around the sleeve 30. This produces a lever action on the respective depending shanks of the jaws swinging them outwardly to carry the jaws away from the pear to release it for spreading into the cups 89. The segments on hubs 37 and 39 being meshed with segments on hubs 38 and 40 concurrently cause the opposed jaws to swing outwardly.

Keyed to the central shaft immediately above the cam 48 is a substantially identical cam 87 with a cam track 86 for the cam roller 85. By this cam, the bar 83 and racks 76 and 77 are reciprocated. The racks 76 and 77 mesh with and oscillate the segmental pinions on stud shafts 72 and 73, and the blade reenforcing members 70 and 71 carrying the wings 64 and 65. When the jaws of the carriage 27 are opened, the cam 87 lowers the roller 85 causing the wings to spread apart to a horizontal plane, the halved sections dropping off into respective paired fruit cups 89 on the main turret 88.

The carriage, and bobbing knife are returned to their initial positions by reversing the direction of travel of the cam roller and its follower plate. Concurrently the two turrets continue to rotate in an intermittent manner; the feed turret to present fruit to the machine; and the main turret to present empty cups to the under side of the wings. The cups filled with halved fruit are advanced to the other stations of the machine indicated by the letters B, C and D. The operations which may take place at stations B, C and D have previously been generally described.

What is claimed as new and is desired to be secured by Letters Patent of the United States is:

1. A fruit splitting and spreading device comprising paired wings, means for supporting said wings, said wings being movable in said supports from parallelism to alinement, a knife adjacent one edge of said wings and alined therewith when said wings are in parallelism, means for advancing a fruit past said knife to divide such fruit longitudinally and for conveying the sections thereof to positions upon opposite faces of said wings, each of said wings having a face with raised areas for engaging the flat faces of such fruit sections, there being a fin on each of said wings bisecting said areas and projecting outwardly from the faces of the wings longitudinally of the direction of movement of such fruit therealong, and means for moving said wings after fruit has been conveyed partly thereacross.

2. The combination of means providing a stationary cutting means having opposed planar surfaces, said cutting means being adapted to cut a whole fruit into half portions, means forming opposed plane surfaces extending substantially in the planes of portions of the cutting means against which the half portions of the fruit are temporarily held after severing, means for holding a fruit, for carrying the same bodily across the stationary cutting means and for holding each half fruit in contact with said extended plane surfaces and fruit penetrating means projecting from each of said plane surfaces directly in the path of movement of the fruit and adapted to enter the cut surface of the fruit for temporarily holding the fruit from shifting relative to each of said plane surfaces.

3. The combination of means providing stationary cutting means having opposed planar surfaces adapted to cut a whole fruit into half portions, means forming opposed plane surfaces extending substantially in the planes of portions of the cutting means against which the half portions of the fruit are temporarily held after severing, means for holding a fruit, for carrying the same bodily across the stationary cutting means and for holding each half fruit in contact with said extended plane surfaces and fruit piercing means projecting from each of said plane surfaces and adapted to enter the cut surface of the fruit for temporarily holding the fruit from shifting relative to each of said plane surfaces, and means for releasing the fruit holding means and means for thereafter discharging the fruit from the impaling means and the plane surface.

4. The combination of means providing stationary cutting means having opposed planar surfaces adapted to cut a whole fruit into half portions, means forming opposed plane surfaces extending substantially in the planes of portions of the cutting means against which the half portions of the fruit are temporarily held after severing, means for holding a fruit, for carrying the same bodily across the cutting means and for holding each half fruit in contact with said extended plane surfaces and fruit piercing means projecting from each of said plane surfaces and adapted to pierce the cut surface of the fruit for temporarily holding the fruit from shifting relative to each of said plane surfaces, and means for shifting each of said plane surfaces for discharging the fruit therefrom.

5. In a device for splitting whole fruit, the combination of fruit severing means, means providing oppositely shiftable means having substantially flat surfaces adapted in one position to be aligned with said cutting means, means for shifting said surfaces in opposite directions and away from the plane occupied by said surfaces when in line with said cutting means, means for conveying a whole fruit so as to cause the cutting means to pass through the core axis of the fruit and whereby each half fruit is held on an opposed plane surface, and means forming an impaling fin extending outwardly from each plane surface and longitudinally disposed in the path of movement of the stem axis of the fruit whereby to enter the stem axis temporarily to impale the fruit and prevent it from shifting laterally.

6. In a device for splitting whole fruit, the combination of means forming a splitting knife, means providing extended oppositely shiftable surfaces at the rear and in line with said splitting knife, means for shifting said surfaces at an angle to the planes of said surfaces when in alinement with said knife, means for conveying a whole fruit so as to cause the splitting knife to pass through the core axis of the fruit and whereby each half fruit is held on one of the opposed plane surfaces, and means forming fruit impaling means extending outwardly from each plane surface and longitudinally disposed in the path of movement of the stem axis of the fruit whereby to enter the stem axis temporarily to impale the fruit and prevent it from shifting laterally, each plane surface being provided with an open recess to prevent adherence of the fruit to the plane surface.

7. Fruit splitting apparatus comprising fruit severing means including an arm having a depending substantially wedge-shaped knife, the front edge of which is formed as a cutting edge and the plane sides of which cutting edge taper outwardly and rearwardly, means forming a plurality of spreading wings, means for moving said wings into a back to back position immediately behind the thickened edge of the cutting means and for spreading said wings outwardly in separated position, means for said wings being mounted separately from said severing knife, the total thickness of said wings at the edge immediately adjacent the cutting knife being substantially of the same thickness as said portion of the cutting knife, each of said wings having a plurality of longitudinally extending grooves and an intervening raised portion lying substantially in the plane of the thickened portion of the cutting knife and a laterally extending fin mounted in said raised portion and lying transversely of the plane of action of the cutting knife and longitudinally of the wings and means for moving a whole fruit across the cutting edge of the cutting knife and on to said wings when the same are in closed position whereby the cut face of each fruit is pierced by said longitudinally extending fin to hold each portion of the fruit from shifting movement and the grooves preventing the formation of a vacuum between the fruit and the surface of the wings.

8. In a device for splitting whole fruit, the combination of means forming a splitting knife, means providing extended, oppositely shiftable surfaces at the rear and in line with said splitting knife, means for shifting said surfaces in opposite directions and away from the planes occupied by said surfaces when in line with said splitting knife, and means for conveying a whole fruit so as to cause the splitting knife to pass through the core axis of the fruit and whereby each half fruit is held on the opposed plane surfaces, said plane surfaces being provided with an impaling fin comprising a longitudinal body portion having spaced lugs projecting outwardly from said plane surfaces at either end of said body portion, which said body portion is largely imbedded below said plane surfaces, said impaling fin being longitudinally disposed in the path of movement of the stem axis of the fruit whereby said lugs enter the stem axis temporarily to impale the fruit and prevent it from shifting laterally.

9. In a device for splitting whole fruit, the combination of fruit severing means, means providing oppositely shiftable means having substantially flat surfaces adapted in one position to be aligned with said severing means, the substantially flat surfaces of each of said oppositely shiftable means being provided with a pair of longitudinally extending grooves leaving an intervening raised portion extending longitudinally of the path of the fruit, means for conveying a whole fruit so as to cause the severing means to pass through the core axis of the fruit whereby each half fruit is held on one of said opposed, substantially flat surfaces, and means forming impaling means extending outwardly from the intervening raised portion on each substantially flat surface and longitudinally disposed in the path of movement of the stem axis of the fruit whereby to enter the stem axis temporarily to impale the fruit and prevent it from shifting laterally.

10. In a device for spliting whole fruit, the combination of fruit severing means, means providing oppositely shiftable means having substantially flat surfaces adapted in one position to be aligned with said severing means, the substantially flat surfaces of each of said oppositely shiftable means being provided with a pair of longitudinally extending grooves, one of which is located along the edge of each of said substantially flat surfaces and the other of which is spaced inwardly from the opposite edge of each of said substantially flat surfaces whereby a raised portion is left at said opposite edge and an intervening raised portion is left between said grooves on each of said flat surfaces, means for conveying a whole fruit so as to cause the severing means to pass through the core axis of the fruit whereby each half fruit is held on one of said opposed, substantially flat surfaces, and means forming an impaling fin extending outwardly from the intervening raised portion on each substantially flat surface and longitudinally disposed in the path of movement of the stem axis of the fruit whereby to enter the stem axis temporarily to impale the fruit and prevent it from shifting laterally.

11. In a device for splitting whole fruit, the combination of fruit severing means, means providing oppositely shiftable means having substantially flat surfaces adapted in one position to be aligned with said severing means, the substantially flat surfaces of each of said oppositely shiftable means being provided with a pair of longitudinally extending grooves leaving an intervening raised portion extending longitudinally of the path of the fruit, said intervening raised portion being further provided with a pair of spaced grooves extending transversely of the path of the fruit, means for conveying a whole fruit so as to cause the severing means to pass through the core axis of the fruit whereby each half fruit is held on one of said opposed, substantially flat surfaces, and means forming an impaling fin extending outwardly from the intervening raised portion on each substantially flat surface and longitudinally disposed in the path of movement of the stem axis of the fruit whereby to enter the stem axis temporarily to impale the fruit and prevent it from shifting laterally.

12. In a device for splitting whole fruit, the combination of fruit severing means including a stationary, substantially wedge-shaped fruit splitting knife, a portion of the front edge of which is formed as a cutting edge and the plane sides of which cutting edge taper outwardly and rearwardly, means providing extended, oppositely shiftable surfaces immediately behind the thickened edge of said knife and in line with said knife, means for shifting said surfaces in opposite directions and away from the planes occupied by said surfaces when in line with said severing means, means for conveying a whole fruit so as to cause the knife to pass through the core axis of the fruit and whereby each half fruit is held on the opposed plane surfaces, and means forming impaling means extending outwardly from each plane surface and longitudinally disposed in the path of movement of the stem axis of the fruit whereby to enter the stem axis temporarily to impale the fruit and prevent it from shifting laterally.

13. In a device for splitting whole fruit, the combination of fruit severing means including a stationary splitting knife mounted on a stationary sleeve surrounding the central drive shaft, means providing extended, oppositely shiftable surfaces at the rear end in line with said knife, means for shifting said surfaces in opposite directions and away from the planes occupied by said surfaces when in line with said knife, means for conveying a whole fruit so as to cause the knife to pass through the core axis of the fruit and whereby each half fruit is held on the opposed plane surfaces, and means forming an impaling fin extending outwardly from each plane surface and longitudinally disposed in the path of movement of the stem axis of the fruit whereby to enter the stem axis temporarily to impale the fruit and prevent it from shifting laterally.

14. In a device for splitting whole fruit, the combination of means forming a splitting knife, means providing extended, oppositely shiftable surfaces at the rear and in line with said splitting knife, means for shifting said surfaces in opposite directions and away from the planes occupied by said surfaces when in line with said splitting knife, including a pair of parallel stud shafts provided with arms extending laterally at right angles to said shafts, upon which the means providing said extended, oppositely shiftable surfaces are mounted, means for conveying a whole fruit so as to cause the splitting knife to pass through the core axis of the fruit and whereby each half fruit is held on the opposed plane surfaces, and means forming an impaling fin extending outwardly from each plane surface and longitudinally disposed in the path of movement of the stem axis of the fruit whereby to enter the stem axis temporarily to impale the fruit and prevent it from shifting laterally.

MARK EWALD.